(12) United States Patent
Okamoto et al.

(10) Patent No.: US 7,105,202 B2
(45) Date of Patent: Sep. 12, 2006

(54) PROCESS FOR COATING INNER WALL OF A THIN TUBE WITH A RESIN

(75) Inventors: Takafumi Okamoto, Wako (JP); Eri Ishikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/128,784

(22) Filed: May 12, 2005

(65) Prior Publication Data
US 2005/0255240 A1 Nov. 17, 2005

(30) Foreign Application Priority Data
May 13, 2004 (JP) .............................. 2004-143949

(51) Int. Cl.
B05D 7/22 (2006.01)
B05D 3/02 (2006.01)

(52) U.S. Cl. .................. 427/238; 427/374.4; 427/379; 427/385.5; 427/398.1; 427/350

(58) Field of Classification Search ................ 427/230, 427/372.2, 374.1, 374.4, 375, 379, 385.5, 427/388.4, 388.5, 398.1, 238, 350, 64, 67; 118/DIG. 10, DIG. 13
See application file for complete search history.

(56) References Cited
U.S. PATENT DOCUMENTS 3,946,125 A * 3/1976 Scheiber ..................... 427/544
5,207,948 A * 5/1993 Wolfe et al. ............ 252/301.36
6,399,145 B1 * 6/2002 Jerebic et al. .............. 427/106
2002/0051855 A1 * 5/2002 Yamamoto et al. ........ 428/35.7
2003/0180456 A1 * 9/2003 Yamada et al. ............. 427/230

FOREIGN PATENT DOCUMENTS
JP        10-160090       6/1998

* cited by examiner

Primary Examiner—Timothy Meeks
Assistant Examiner—William Phillip Fletcher, III
(74) Attorney, Agent, or Firm—Lahive & Cockfield, LLP; Anthony A. Laurentano, Esq.

(57) ABSTRACT

A process for coating the inner wall surface of a thin tube having an inside diameter of 0.2 to 5 mm with a resin. The tube is first filled with a resin particulate dispersion. The dispersion filling the tube is held therein by its surface tension and does not flow out. A heater is positioned about the upper end of the tube and is moved down toward its lower end to heat the tube and thereby cause minute resin particles to adhere to its inner wall surface. Then, the tube is heated in a furnace and is cooled to have its inner wall surface coated with the resin.

5 Claims, 9 Drawing Sheets

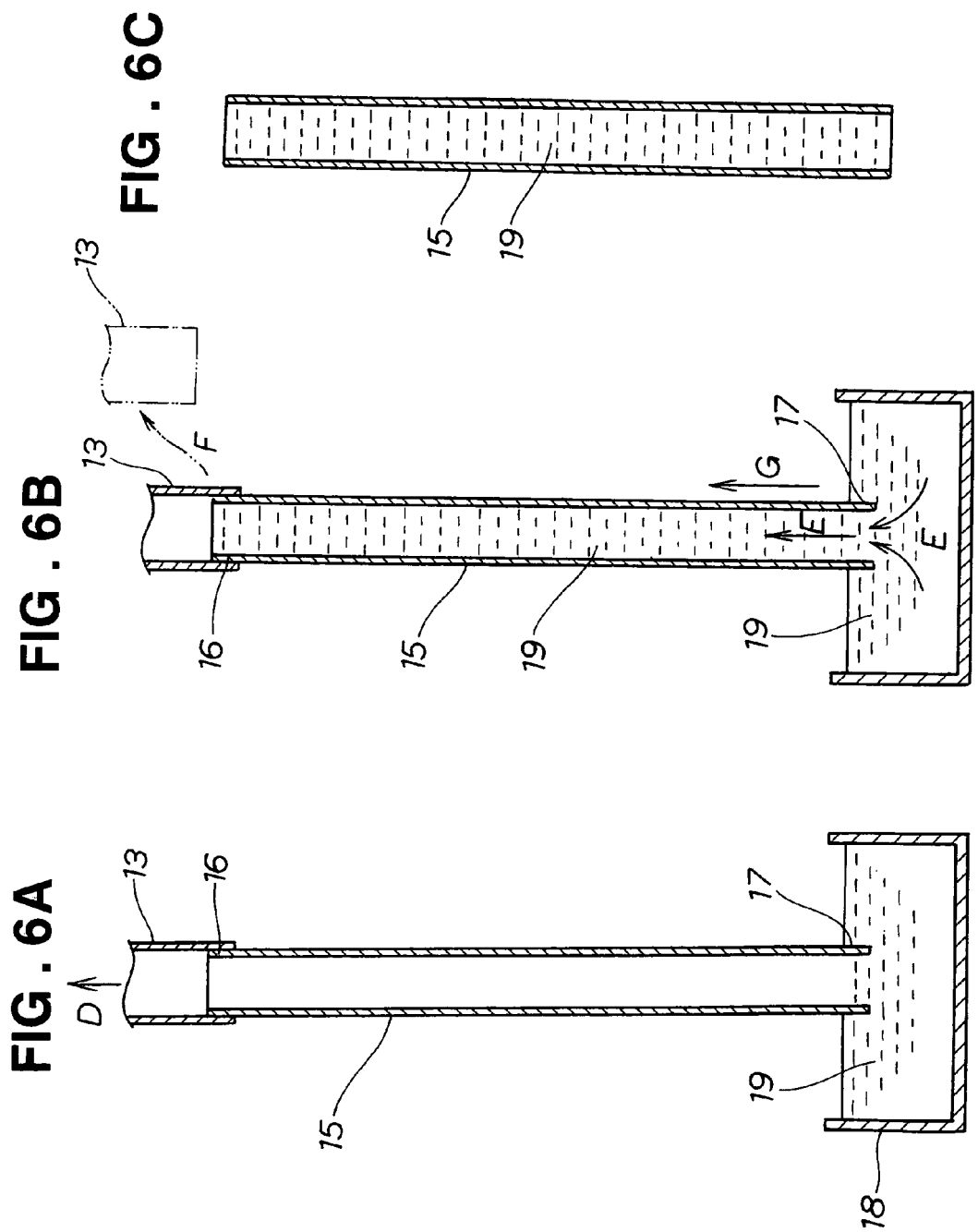

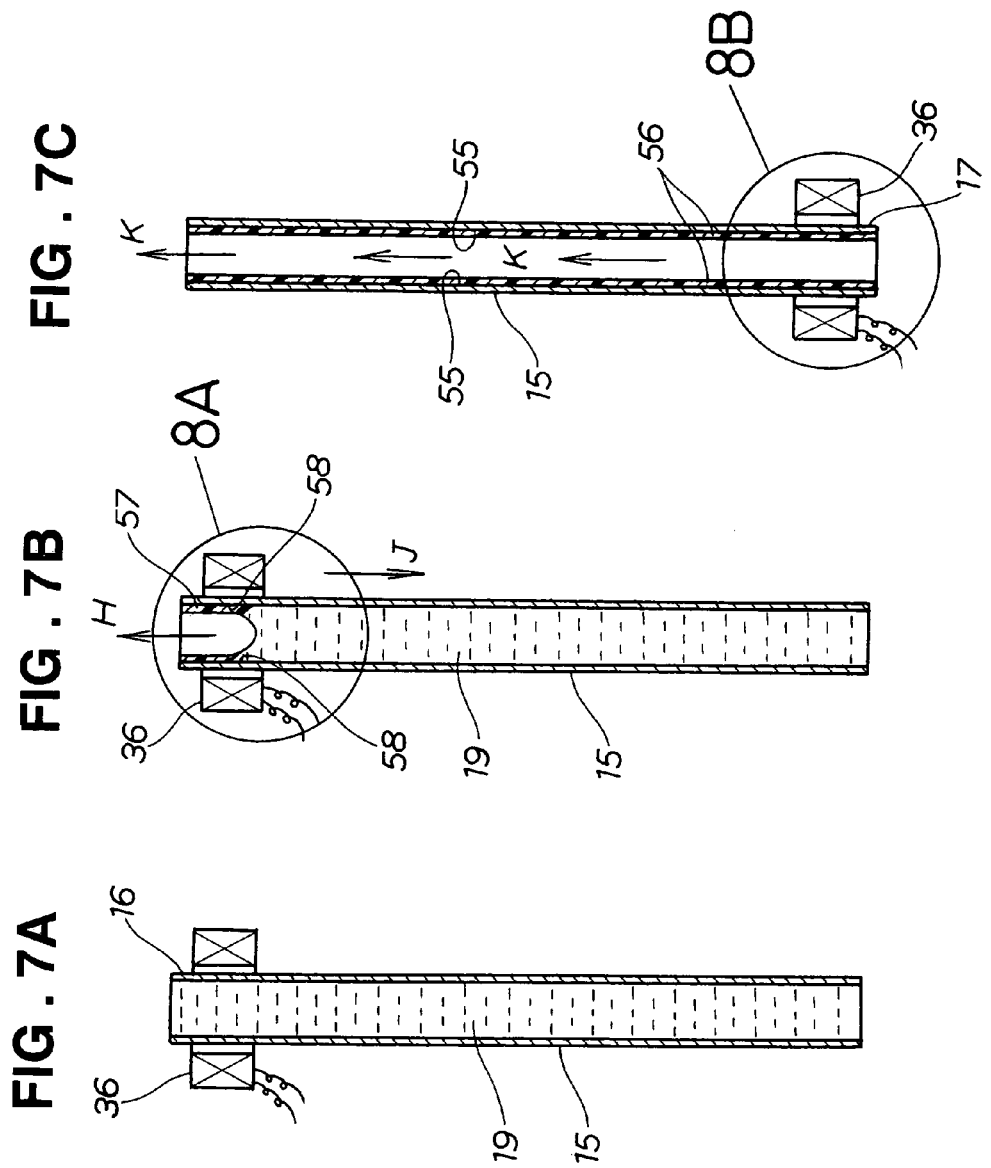

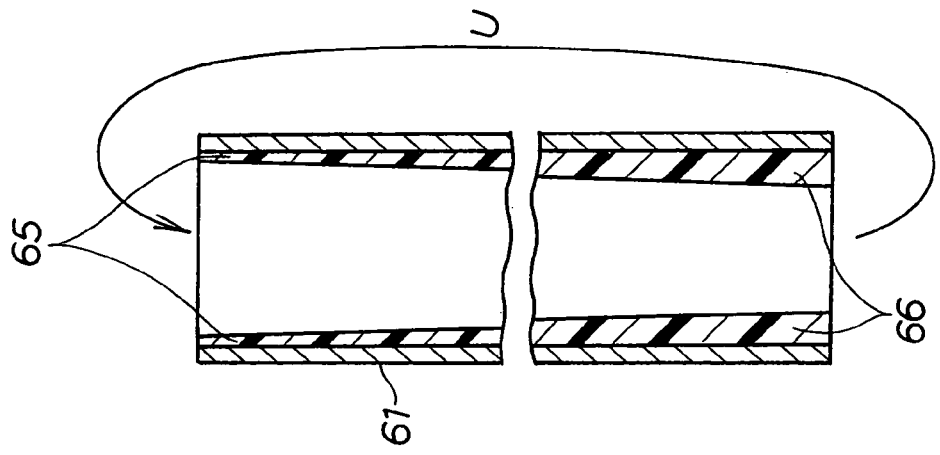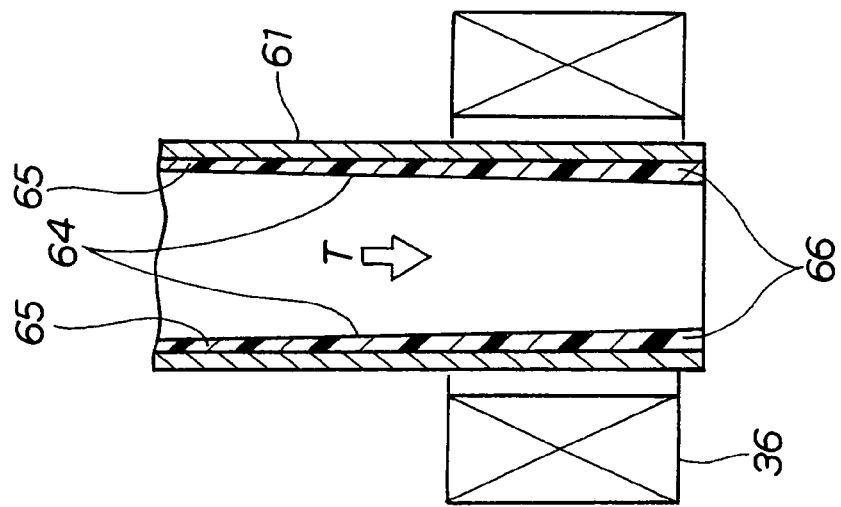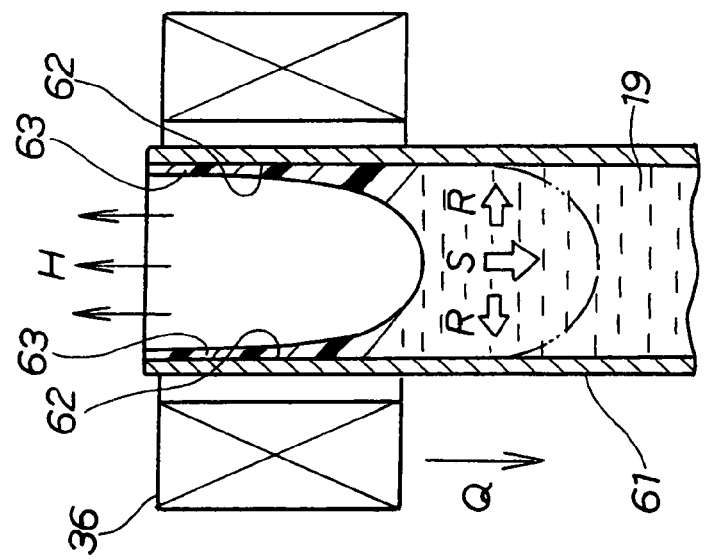

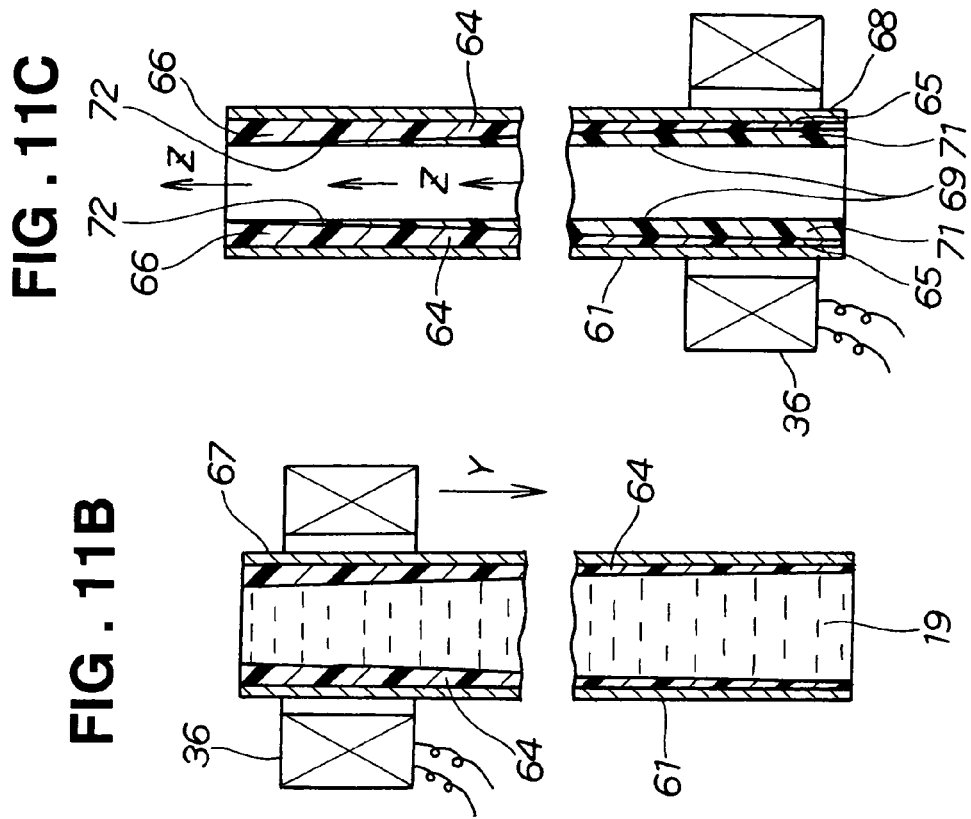

PROCESS FOR COATING INNER WALL OF A THIN TUBE WITH A RESIN

FIELD OF THE INVENTION

This invention relates to a process for coating an inner wall of a tube, particularly a thin tube having a small diameter, with a resin.

BACKGROUND OF THE INVENTION

Resin lining is known as one of the methods of coating the surface of a material with a resin. Resin lining is usually employed for coating the inner surface of a pipe having a large diameter or a can with a resin for purposes including corrosion proofing, surface smoothing and life prolongation.

A method in which a resin powder is applied to the inner surface of a pipe having a large diameter, is dried, is melted under heat and is solidified by cooling to form a resin coating thereon is known as disclosed in, for example, JP-A-10-160090. It discloses in Example 2 a resin coating formed on the inner surface of a steel pipe having a diameter of 2,000 mm and a length of 4,000 mm by applying thereto a slurry composed of a resin powder and a solvent (hereinafter called the resin powder dispersion), melting the dispersion under heat and cooling it.

Attempts have been made to have a resin powder or minute resin particles adhere to the inner wall surface of a thin tube having an inside diameter of, say, 0.2 to 5 mm by filling the tube with a resin powder dispersion composed of the resin powder and a solvent, or a resin particulate dispersion composed of the minute resin particles and a solvent, and placing it in a position allowing the solvent to fall by gravity so that the solvent may be removed from the tube, leaving the resin powder or minute resin particles on the inner wall surface of the tube. The surface tension of the solvent is, however, so strong as not to allow it to fall down the inner wall surface of the tube and thereby leave the resin adhering thereto.

Therefore, it is hoped that technology be developed for coating the inner wall surface of a thin tube having an inside diameter of, say, 0.2 to 5 mm with a resin by having minute resin particles adhere thereto uniformly, melting them under heat and cooling them.

SUMMARY OF THE INVENTION

According to this invention, there is provided a process for coating the inner wall surface of a thin tube with a resin, which comprises the steps of: filling the tube having an inside diameter of 0.2 to 5 mm with a resin particulate dispersion containing minute resin particles and a solvent; positioning a heater at the upper end of the tube placed in an upright or slanting position; heating the tube by moving the heater relative to the tube toward its lower end for vaporizing the solvent from the dispersion, while leaving the resin particles adhering to the whole inner wall surface of the tube, and thereby forming a layer of the resin particles adhering to the inner wall surface of the tube; and heating and cooling the tube to have its inner wall surface coated with the resin.

The step of filling the tube having an inside diameter of 0.2 to 5 mm with a resin particulate dispersion containing minute resin particles and a solvent may be carried out by, for example, dipping the lower end of the tube in the dispersion and evacuating the tube to draw the dispersion up to its upper end.

The step of leaving the resin particles adhering to the whole inner wall surface of the tube, and thereby forming a layer of the resin particles adhering to the inner wall surface of the tube may be carried out by, for example, positioning the heater around the upper end of the tube and moving it at a uniform speed from the upper end of the tube to its lower end to vaporize the solvent from the dispersion at a temperature slightly lower than its boiling point.

The step of melting the resin adhering to the inner wall surface of the tube and thereby coating it with the resin may be carried out by, for example, heating the tube for a specific length of time in an inert atmosphere at a temperature higher by about 40° C. to about 60° C. than the melting point of the resin adhering to the inner wall surface of the tube.

According to the invention, the solvent is vaporized by moving the heater down relative to the tube along it, as stated. The solvent is vaporized from the resin particulate dispersion from the upper portion of the tube to its lower portion and thereby leaves the resin particles adhering to the inner wall surface of the tube. The movement of the heater and the tube relative to each other allows the resin particles to adhere to the inner wall surface of the tube progressively from its upper end to its lower end. This makes it possible to have minute resin particles adhere uniformly to the inner wall surface of a thin tube having an inside diameter of, say, 0.2 to 5 mm and coat it when they are melted by heating and cooled.

BRIEF DESCRIPTION OF THE DRAWINGS

A preferred embodiment of this invention will now be described in detail with reference to the accompanying drawings, in which:

FIGS. 6A to 6C are a series of sectional views showing the step of filling a thin tube having an inside diameter of 0.2 to 1 mm with a resin particulate dispersion in accordance with a first embodiment of this invention;

FIGS. 7A to 7C are a series of sectional views showing the step of forming a layer of minute resin particles adhering to the inner wall surface of the tube having an inside diameter of 0.2 to 1 mm in accordance with the first embodiment of this invention;

FIGS. 10A to 10C are a series of sectional views showing the step of forming a first layer of minute resin particles adhering to the inner wall surface of a thin tube having an inside diameter of 1 to 5 mm and the step of turning the tube upside down in accordance with a second embodiment of this invention; and FIGS. 11A to 11C are a series of sectional views showing the step of forming another layer of resin particles adhering to the first layer formed in FIG. 10C.

DETAILED DESCRIPTION OF THE PREFERRED EMBODIMENT

Figure 1:
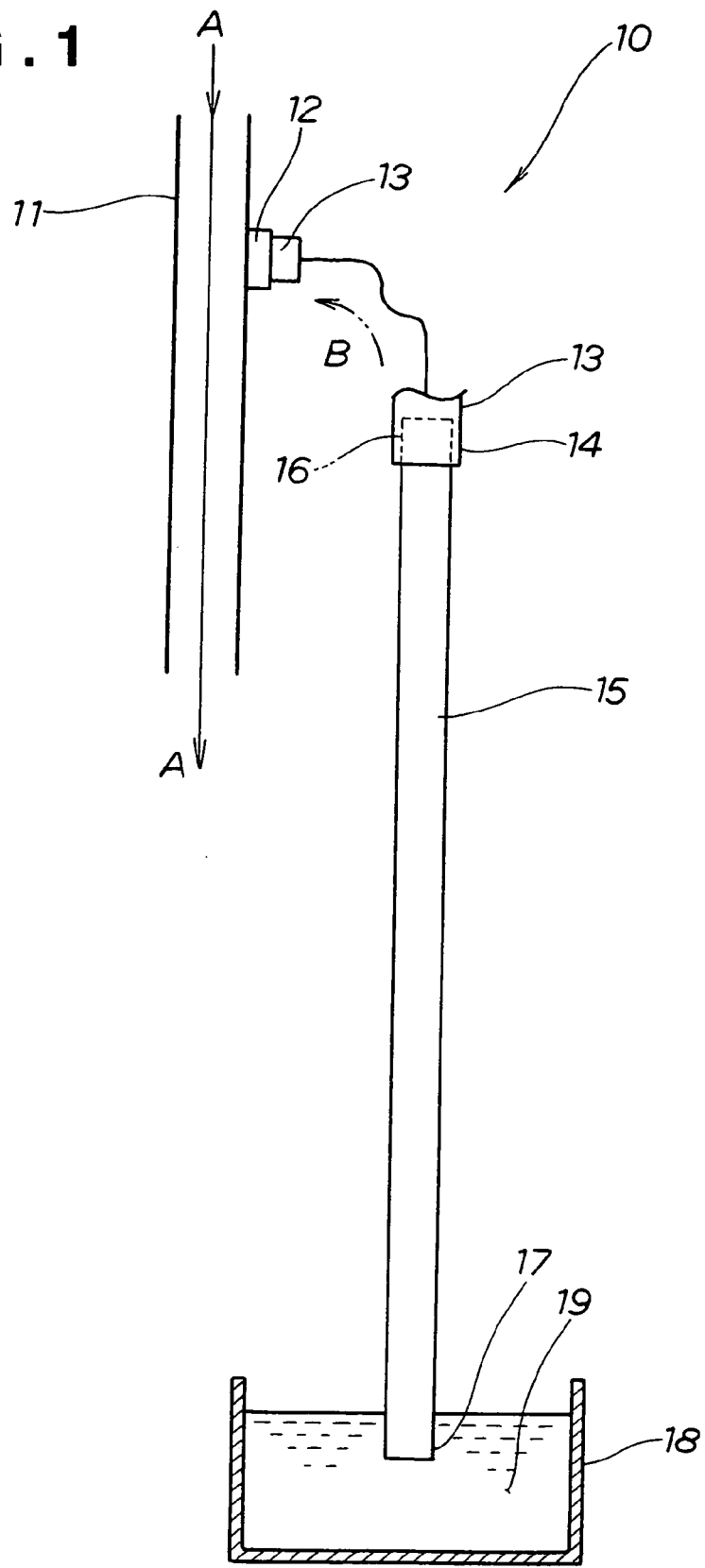
FIG. 1 is a schematic diagram of a suction device used in accordance with the process of this invention for filling a thin tube with a resin particulate dispersion.

Referring first to FIG. 1, there is shown a suction device 10 for a resin particulate dispersion which includes a pipe 11 attached to a suction unit, a suction port member 12 attached to the pipe 11 and a suction hose 13 connected to the suction port member 12. A thin tube 15 (more specifically, a quartz glass tube) has its upper end 16 fitted into one end 14 of the suction hose 13 and its lower end 17 dipped in a resin particulate dispersion 19 filling a vessel 18. A fluid is passed through the pipe 11 attached to a suction unit as shown by an arrow A to create a negative pressure in the suction hose 13 and the tube 15 and thereby draw up the resin particulate dispersion 19 into the tube 15, as suggested by an arrow B. The tube 15 has an inside diameter of about 0.2 to about 5 mm.

The resin particulate dispersion 19 is preferably obtained by dispersing in water or an organic solvent minute resin particles having an average diameter of 0,1 to 15 µm in the amount of 20 to 40% based on the weight of the solvent. The resin particles which are employed are of, for example, polyether ether ketone (PEEK), polyphenylene sulfide (PPS), a tetrafluoroethyl-ene-perfluoroalkylvinyl ether copolymer resin (PFA), polytetrafluoroethylene (PTFE), an ethylene-tetrafluoroethylene copolymer (ETFE), a perfluoroethylene-propene copolymer (FEP) or polyethersulfone (PES).

Figure 2:
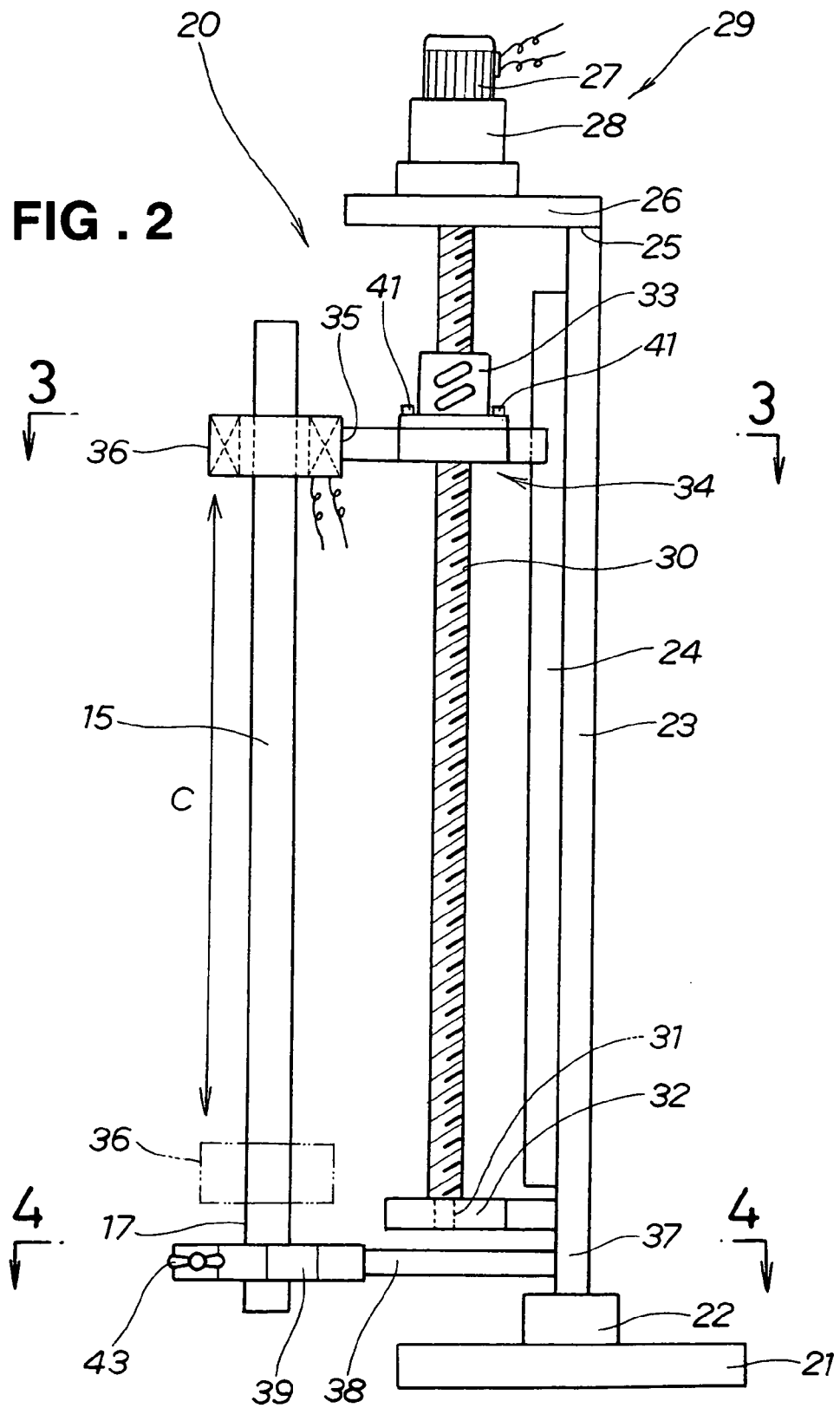
FIG. 2 is a diagram showing a mechanism for driving a heater used in accordance with the process of this invention for forming a layer of minute resin particles adhering to the tube.

FIG. 2 shows an apparatus for forming a layer of minute resin particles adhering to the inner surface of the tube. The apparatus includes a heater driving mechanism 20 including a post 23 rising from a boss 22 on a base 21. A rail 24 extends along the post 23. A beam 26 extends from the upper end 25 of the post 23. A driving unit 29 is mounted on the beam 26. The driving unit 29 includes a motor 27 and a speed reducer 28. A vertically extending ball screw 30 is driven for turning by the driving unit 29. The ball screw 30 has a lower end 31 supported by a support member 32 extending from the post 23. A slider 34 is threadedly connected with a nut 33 engaging the ball screw 30. The slider 34 has a distal end 35 to which a ring-shaped heater 36 is attached. The turning of the ball screw 30 by the driving unit 29 allows the heater 36 to move up and down, as suggested by an arrow C.

A tube support member 38 extends from the lower end portion 37 of the post 23. The tube support member 38 carries a clamp 39 at its distal end. A vertically extending tube 15 has its lower end portion 17 held by the clamp 39.

Reference numeral 41 denotes bolts by which the nut 33 and the slider 34 are fastened together. Reference numeral 43 denotes a clamp adjust screw for adjusting the tightening force of the clamp 39.

Although the temperature at which the solvent is vaporized depends on the solvent used and has, therefore, to be selected experimentally on a case to case basis, it is usually desirable to select a temperature which is about 5–20° C. lower than the boiling point of the solvent.

The tube 15 is set in a vertical position as shown, or in a slanting position. The heater 36 may alternatively be of the type which is manually moved, though it has been described as being moved by the driving unit 29.

Figure 3:
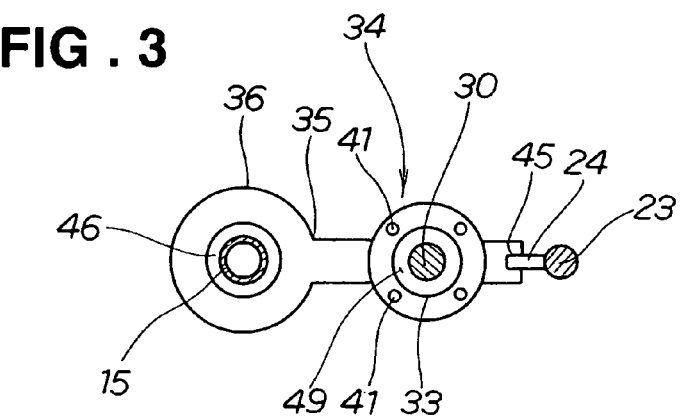
FIG. 3 is a sectional view taken along the line 3—3 of FIG. 2.

The slider 34 has a rail engaging portion 45 fitted over the rail 24 extending along the post 23 and carries the heater 36 at its distal end 35, as shown in FIG. 3. The heater 36 and the tube 15 extending therethrough have a gap 46 defined therebetween. The nut 33 and the slider 34 are fastened together by the bolts 41. The ball screw 30 and the slider 34 through which it extends have a gap 49 defined therebetween. The nut 33 does not turn with the ball screw 30, since it is fastened to the slider 34 by the bolts 41.

Figure 4:
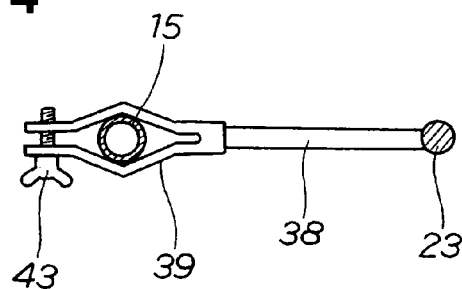
FIG. 4 is a sectional view taken along the line 4—4 of FIG. 2.

The tube 15 is held by the clamp 39 carried at the distal end of the tube support member 38 extending horizontally from the post 23, as shown in FIG. 4. The clamp adjust screw 43 makes it possible to adjust the tightening force of the clamp 39 so that the tube 15 may be secured in position appropriately.

Figure 5:
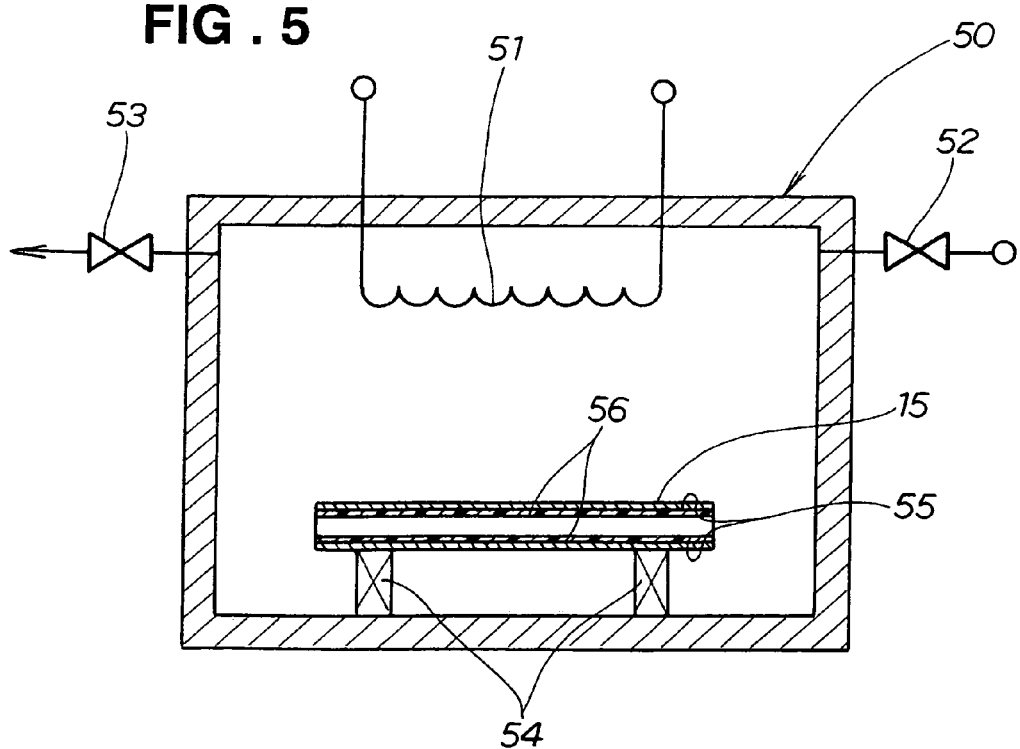
FIG. 5 is a sectional view of a heating furnace used in the step of forming a resin coating layer on the inner wall surface of the tube in accordance with this invention.

FIG. 5 shows a heating furnace used for forming a resin coating layer in a thin tube. The heating furnace 50 has a heater 51, an inert gas feeding device 52, a gas exhausting device 53 and a base 54. A thin tube 15 is placed on the base 54 and has an inner wall 55 to which a resin 56 adheres.

Description will now be made of a method of coating the inner wall surface of a thin tube having an inside diameter of 0.2 to 1 mm with a resin according to a first embodiment of this invention with reference to FIGS. 6A to 6C, 7A to 7C, 8A, 8B, 9A and 9B.

FIGS. 6A to 6C show a thin tube having an inside diameter of 0.2 to 1 mm as being filled with a resin particulate dispersion. Referring to FIG. 6A, the suction hose 13 is fitted over the upper end 16 of the tube 15 and its lower end 17 is dipped in the resin particulate dispersion 19 filling the vessel 18. The suction device 10 (FIG. 1) for the resin particulate dispersion is started to draw air out as shown by an arrow D and create a negative pressure in the suction hose 13 and the tube 15 so that the resin particulate dispersion 19 can be drawn thereinto.

Referring to FIG. 6B, the resin particulate dispersion 19 is drawn up through the lower end 17 of the tube 15 as shown by arrows E, and when it has filled the tube 15, the suction hose 13 is removed therefrom as shown by an arrow F and the lower end 17 of the tube 15 is lifted away from the resin particulate dispersion 19 as shown by an arrow G. FIG. 6C shows the tube 15 filled with the resin particulate dispersion 19 which has been drawn up. The resin particulate dispersion 19 is a dispersion obtained by dispersing in water or any of various kinds of organic solvents 20 to 40% of minute resin particles having an average diameter of 0.1 to 15 µm based on the solvent weight. The resin particulate dispersion 19 filling the tube 15 is held therein by its surface tension and does not flow out of the tube 15.

The tube 15 having an inside diameter of 0.2 to 1 mm is filled with the resin particulate dispersion 19 containing minute resin particles and a solvent by creating a negative pressure in the tube 15 and drawing up the resin particulate dispersion 19 thereinto through its lower end 17, as described above.

Figure 8A:
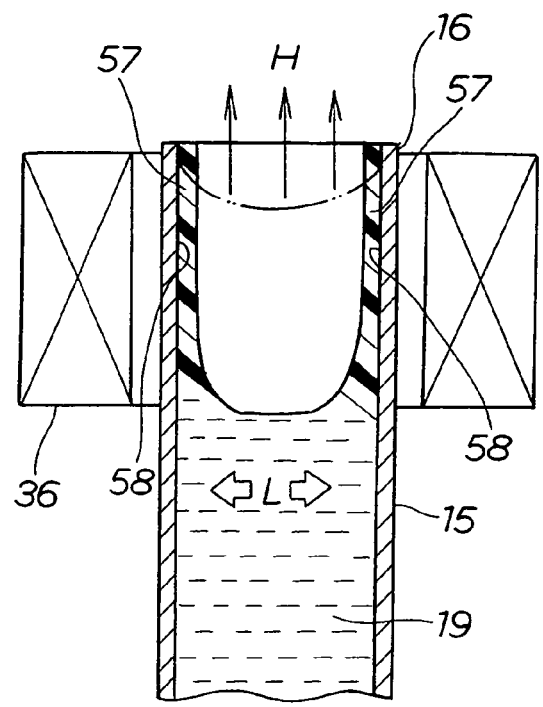
FIG. 8A is an enlarged view of part 8A of FIG. 7B.

FIGS. 7A to 7C, 8A and 8B show a layer of minute resin particles as being formed to adhere to the inner wall surface of the tube having an inside diameter of 0.2 to 1 mm. Referring to FIG. 7A, the heater 36 is positioned about the upper end 16 of the tube 15 filled with the resin particulate dispersion 19. FIG. 7B shows the heater 36 which has been switched on and started heating. The solvent vaporizes as shown by an arrow H from that portion of the tube 15 which is heated by the heater 36, while the resin 57 adheres to the inner wall 58 of the tube toward its upper end. More specifically, the solvent vaporizes as shown by the arrow H from the inside of the tube 15 toward its upper end 16 about which the heater 36 is positioned, and the resin 57 adheres to the inner wall 58 of the tube toward its upper end in a uniform thickness across it, as shown in FIG. 8A. This is due to the fact that the tube 15 has an inside diameter of 0.2 to 1 mm which is so small that the resin particulate dispersion 19 is hardly affected by gravity, but adheres uniformly to the inner wall 58 of the tube 15 toward its upper end as shown by arrows L. Then, the heater 36 is gradually lowered as shown by an arrow J in FIG. 7B.

Figure 8B:
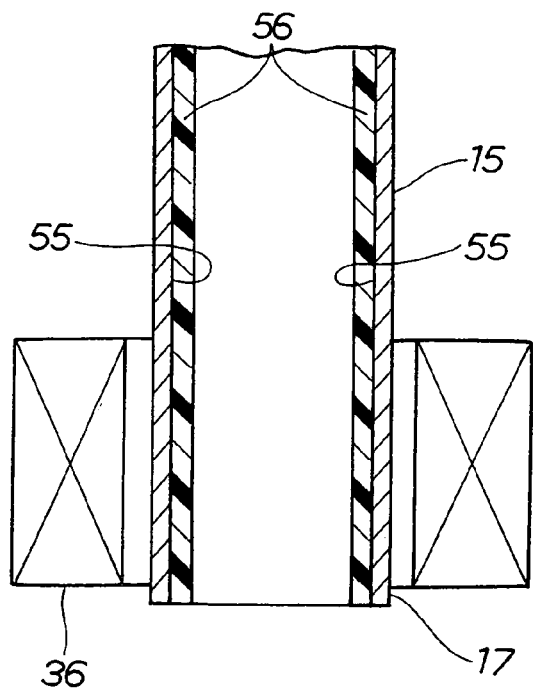
FIG. 8B is an enlarged view of part 8B of FIG. 7C.

Referring to FIG. 7C, the heater 36 is lowered to the lower end 17 of the tube 15 to cause the solvent to vaporize as shown by arrows K. As a result, a layer of the adhering resin 56 is formed on the inner wall 55 of the tube 15. More specifically, a uniform layer of the resin 56 adheres to the inner wall surface 55 of the tube when the heater 36 is lowered to the lower end 17 of the tube 15, as shown in FIG. 8B.

Thus, the adhering layer of minute resin particles is formed on the whole inner wall surface 55 of the tube by positioning the heater 36 about the upper end 16 of the tube 15 filled with the resin particulate dispersion 19, moving the heater 36 at a uniform speed from the upper end 16 of the tube 15 to its lower end 17 and vaporizing the solvent from the resin particulate dispersion 19 at a temperature which is somewhat lower than the boiling point of the solvent, or more specifically about 5° C. to about 20° C. lower, as stated before.

Figure 9A:
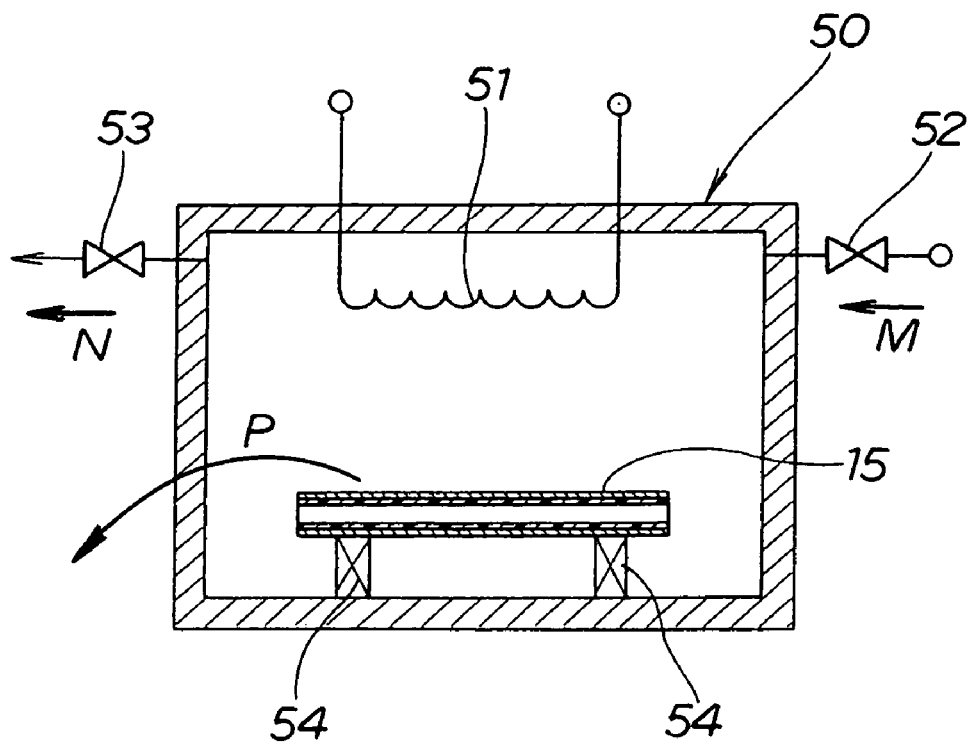
FIGS. 9A and 9B are a set of views showing the step of forming a resin coating layer on the inner wall surface of the tube having an inside diameter of 0.2 to 1 mm in accordance with the first embodiment of this invention.
Figure 9B:
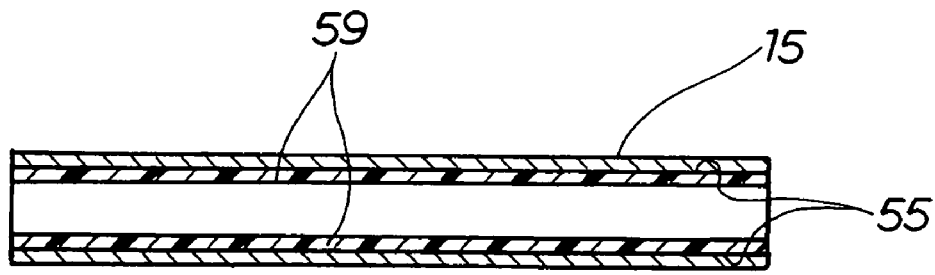

FIGS. 9A and 9B show a resin coating layer as being formed on the inner wall surface of the tube having an inside diameter of 0.2 to 1 mm. The tube 15 is heated in the heating furnace 50. More specifically, the tube 15 is placed on the base 54 in the heating furnace 50 and the heater 51 is set for a furnace temperature which is 40–60° C. higher than the melting point of the resin. Then, an inert gas is caused to flow into the furnace as shown by an arrow M through the inert gas feeding device 52 to create an inert gas atmosphere in the furnace and the tube 15 is heated for a specific length of time, while the gas is exhausted through the gas exhausting device 53 as shown by an arrow N. The resin adhering to the inner wall surface of the tube is melted and coats the inner wall surface of the tube. After a specific time of treatment, the tube 15 is removed from the furnace as shown by an arrow P, and is cooled. The tube 15 as cooled has a resin coating layer 59 formed on its inner wall surface 55, as shown in FIG. 9B.

Description will now be made of a method of coating the inner wall surface of a thin tube having an inside diameter of 1 to 5 mm with a resin according to a second embodiment of this invention with reference to FIGS. 10A to 10C and 11A to 11C. Referring to FIG. 10A, the solvent vaporizes as shown by arrows H from the tube 61 having an inside diameter of 1 to 5 mm toward its upper end about which the heater 36 is positioned, and a resin 63 adheres to the inner wall surface 62 of the tube toward its upper end. With the lowering of the heater 36 as shown by an arrow Q, the resin particulate dispersion 19 not only moves horizontally as shown by arrows R, but also is affected by gravity as shown by an arrow S, since the tube 61 has an inside diameter of 1 to 5 mm.

With the dropping, as shown by an arrow T, of the resin particulate dispersion 19 shown in FIG. 10A, the resin 64 forms a thin adhering layer portion 65 in the upper portion of the tube 61 having an inside diameter of 1 to 5 mm and a thick adhering layer portion 66 in its lower portion upon arrival of the heater 36 at the lower end of the tube 61 having an inside diameter of 1 to 5 mm, as shown in FIG. 10B. Therefore, the tube 61 having an inside diameter of 1 to 5 mm to which the resin has already been caused to adhere as described, is turned upside down as shown by an arrow U in FIG. 10C, and the resin is caused to adhere to the tube once again, as will be explained with reference to FIGS. 11A to 11C.

Referring to FIG. 11A, the resin particulate dispersion 19 is drawn up through the lower end 68 of the tube 61 having an inside diameter of 1 to 5 mm as shown by arrows V and fills the tube 15. Then, the suction hose 13 is removed from the upper end 67 of the tube 61 as shown by an arrow W and the lower end 68 of the tube 61 having an inside diameter of 1 to 5 mm is lifted from the resin particulate dispersion 19 as shown by an arrow X. Then, the heater 36 is positioned about the upper end 67 of the tube 61 having an inside diameter of 1 to 5 mm and filled with the resin particulate dispersion 19, as shown in FIG. 11B. Then, the heater 36 is moved down as shown by an arrow Y. Referring to FIG. 11C, the heater 36 is lowered to the lower end 68 of the tube 61 having an inside diameter of 1 to 5 mm and the solvent is all vaporized as shown by arrows Z, thereby forming a second adhering layer of resin 69 on the radially inner surface of the resin 64 adhering to the tube 61 having an inside diameter of 1 to 5 mm as a result of its first heating as described above. Thus, the second adhering layer of resin 69 has a thick adhering layer portion 71 formed on the inner surface of the thin adhering layer portion 65 of the first adhering layer of resin 64, and a thin adhering layer portion 72 formed on the inner surface of its thick adhering layer portion 66.

Thus, the method according to the second embodiment of this invention causes a resin layer of uniform thickness to adhere to the inner wall surface of the tube 61 having an inside diameter of 1 to 5 mm by changing its positions to draw up the resin particulate dispersion 19 thereinto twice and heating it each time, as described. Then, the tube 61 having an inside diameter of 1 to 5 mm is heated for a specific length of time in the heating furnace having an inert gas atmosphere, is removed from the furnace and is cooled to have a uniform resin coating layer formed on its inner wall surface.

Any apparatus that can create a negative pressure in the upper end portion of the tube 15 or the tube 61 having an inside diameter of 1 to 5 mm and in the suction hose 13 can be used for filling the tube 15 or 61 with the resin particulate dispersion 19, and therefore, a pipette, aspirator, or vacuum pump can, for example, be used for that purpose.

Although the first and second embodiments of this invention have been described as moving down the heater 36 for vaporizing the solvent from the resin particulate dispersion 19 and thereby causing the resin to adhere to the inner surface of the tube 15 or the tube 61 having an inside diameter of 1 to 5 mm, it is alternatively possible to fix the heater 36 and move the tube 15 or 61 vertically.

Although a quartz glass tube has been mentioned as the tube 15 or the tube 61 having an inside diameter of 1 to 5 mm, this invention is applicable to another kind of glass tube, a stainless steel tube, an aluminum alloy tube, a copper tube or a copper alloy tube, too.

The solvent used in the resin particulate dispersion 19 may be selected from among, for example, water, methanol, ethanol, isopropanol, toluene, xylene, N-methylpyrrolidone, methyl ethyl ketone and methyl isobutyl ketone.

What is claimed is:

1. A process for coating an inner wall surface of a thin tube with a resin, comprising the steps in the named order of:

filling the tube having an inside diameter of 0.2 to 5 mm with a resin particulate dispersion containing resin particles and a solvent;

positioning a heater at an upper end of the tube while the tube is held in an upright or slanting position with the dispersion held inside the tube by surface tension of the resin particulate dispersion so that the dispersion does not flow out the tube;

while keeping this condition, heating the tube by moving the heater relative to the tube toward a lower end of the tube for vaporizing the solvent from the dispersion, while leaving the resin particles adhering to the whole inner wall surface of the tube, and thereby forming a layer of the resin particles adhering to the inner wall surface of the tube;

further heating the tube for causing the resin particles to melt and coat the inner wall surface of the tube; and cooling the tube to solidify a resin layer coated on the inner wall surface of the tube, wherein said filling is carried out by introducing the resin particulate dispersion into the tube by suction with the lower end of the tube dipped in the resin particulate dispersion held in a vessel.

2. A process for coating an inner wall surface of a thin tube with a resin, comprising the steps in the named order of:

filling the tube having an inside diameter of 0.2 to 5 mm with a resin particulate dispersion containing resin particles and a solvent;

positioning a heater at an upper end of the tube while the tube is held in an upright or slanting position with the dispersion held inside the tube by surface tension the resin particulate dispersion so that the dispersion does not flow out the tube;

while keeping this condition, heating the tube by moving the heater relative to the tube toward a lower end of the tube for vaporizing the solvent from the dispersion, while leaving the resin particles adhering to the whole inner wall surface of the tube, and thereby forming a layer of the resin particles adhering to the inner wall surface of the tube;

further heating the tube for causing the resin particles to melt and coat the inner wall surface of the tube; and cooling the tube to solidify a resin layer coated on the inner wall surface of the tube, wherein said filling, positioning, heating, further heating, and cooling are carried out twice in such a manner that one end of the tube, which forms the upper end of the tube while being held in the upright or slanting position and moved relative to the heater in a first sequence of operations, forms a lower end of the same tube in a second sequence of operations.

3. The process of claim 2, wherein said filling is carried out by introducing the resin particulate dispersion into the tube by suction with the lower end of the tube dipped in the resin particulate dispersion held in a vessel.

4. The process of claim 2, wherein said heating is carried out by moving the heater at a constant speed relative to the tube from the upper end to the lower end of tube for causing the solvent vaporize from the resin particulate dispersion at a temperature which is about 5 to about 20° C. lower than a boiling point of the solvent.

5. The process of claim 2, wherein said further heating is carried out by heating the tube for a predetermined length of time within an inert gas atmosphere heated at a temperature which is 40 to 60° C. higher than a melting point of the resin.

\* \* \* \* \*